(12) United States Patent
Yang

(10) Patent No.: US 8,800,239 B2
(45) Date of Patent: Aug. 12, 2014

(54) BOLTED STEEL CONNECTIONS WITH 3-D JACKET PLATES AND TENSION RODS

(71) Applicant: WeiHong Yang, Sunnyvale, CA (US)

(72) Inventor: WeiHong Yang, Sunnyvale, CA (US)

( * ) Notice: Subject to any disclaimer, the term of this patent is extended or adjusted under 35 U.S.C. 154(b) by 0 days.

(21) Appl. No.: 13/625,869

(22) Filed: Sep. 24, 2012

(65) Prior Publication Data

US 2014/0083046 A1 Mar. 27, 2014
US 2014/0182235 A9 Jul. 3, 2014

Related U.S. Application Data

(63) Continuation-in-part of application No. 12/804,602, filed on Apr. 19, 2010, now abandoned.

(51) Int. Cl.
*E04B 1/38* (2006.01)

(52) U.S. Cl.
USPC ............ 52/655.1; 52/713; 403/218; 403/286; 403/293; 403/403

(58) Field of Classification Search
CPC ................ E04B 2001/2415; E04B 2001/2418; E04B 2001/2421; E04B 2001/2424; E04B 2001/2457; E04B 2001/2448; E04B 2001/2644; E04B 2001/2692; E04B 1/2608; E04B 1/5812
USPC ............ 52/655.1, 713, 651.11; 403/387, 293, 403/286, 218, 403
See application file for complete search history.

(56) References Cited

U.S. PATENT DOCUMENTS

| | | | | |
|---|---|---|---|---|
| 933,067 A * | 9/1909 | Ferry | ............................ | 403/205 |
| 2,732,654 A * | 1/1956 | Sullivan | ........................ | 446/127 |
| 2,931,129 A * | 4/1960 | Boniface | ........................ | 446/126 |
| 3,099,468 A * | 7/1963 | Meyerdick | ........................ | 403/25 |
| 3,414,300 A * | 12/1968 | Spane | ........................... | 403/300 |
| 3,425,720 A * | 2/1969 | Spane | ........................... | 403/247 |
| 3,846,030 A * | 11/1974 | Katt | ............................... | 403/2 |
| 3,987,872 A * | 10/1976 | Sabes | ......................... | 188/264 E |
| 4,024,691 A * | 5/1977 | Hansen et al. | ............... | 52/656.9 |
| 4,315,386 A * | 2/1982 | Clarke | ........................... | 52/93.1 |
| 4,330,221 A * | 5/1982 | Stumm | ......................... | 403/218 |
| 4,335,555 A | 6/1982 | Southerland et al. | | |
| 4,411,547 A * | 10/1983 | Johnson | ........................ | 403/205 |
| 4,551,957 A * | 11/1985 | Madray | .......................... | 52/93.2 |
| 4,688,358 A * | 8/1987 | Madray | .......................... | 52/93.2 |
| 4,697,393 A * | 10/1987 | Madray | .......................... | 52/93.2 |
| 4,974,387 A | 12/1990 | Dufour | | |
| 5,156,484 A * | 10/1992 | Allen | ............................ | 403/295 |
| 5,503,493 A | 4/1996 | Kato et al. | | |
| 5,524,397 A * | 6/1996 | Byers et al. | ..................... | 52/92.2 |
| 5,577,353 A | 11/1996 | Simpson | | |
| 5,660,005 A * | 8/1997 | Tacoma | ......................... | 52/93.2 |
| 6,516,583 B1 | 2/2003 | Houghton | | |
| 6,941,718 B1 | 9/2005 | diGirolamo et al. | | |
| 7,299,596 B2 | 11/2007 | Hildreth | | |
| 7,310,920 B2 | 12/2007 | Hovey, Jr. | | |
| 7,856,763 B2 * | 12/2010 | Keys et al. | ..................... | 52/92.2 |
| 8,028,494 B2 * | 10/2011 | Denn et al. | ...................... | 52/848 |
| 2008/0178551 A1 | 7/2008 | Porter | | |
| 2009/0007520 A1 * | 1/2009 | Navon | .............................. | 52/837 |
| 2010/0044524 A1 * | 2/2010 | Sugaya et al. | .................. | 248/49 |
| 2010/0086348 A1 * | 4/2010 | Funahashi et al. | ............ | 403/306 |
| 2011/0252743 A1 * | 10/2011 | Yang | .............................. | 52/849 |
| 2011/0308063 A1 * | 12/2011 | Feeleus | ....................... | 29/525.01 |

* cited by examiner

*Primary Examiner* — Robert Canfield
(74) *Attorney, Agent, or Firm* — Law Office of Dorian Cartwright

(57) ABSTRACT

A three-dimensional jacket-plate connector connects at least two members. Each member comprises wide-flanged steel I-beam section. The jacket-plate connector comprises first and second three-dimensional jacket plates.

16 Claims, 25 Drawing Sheets

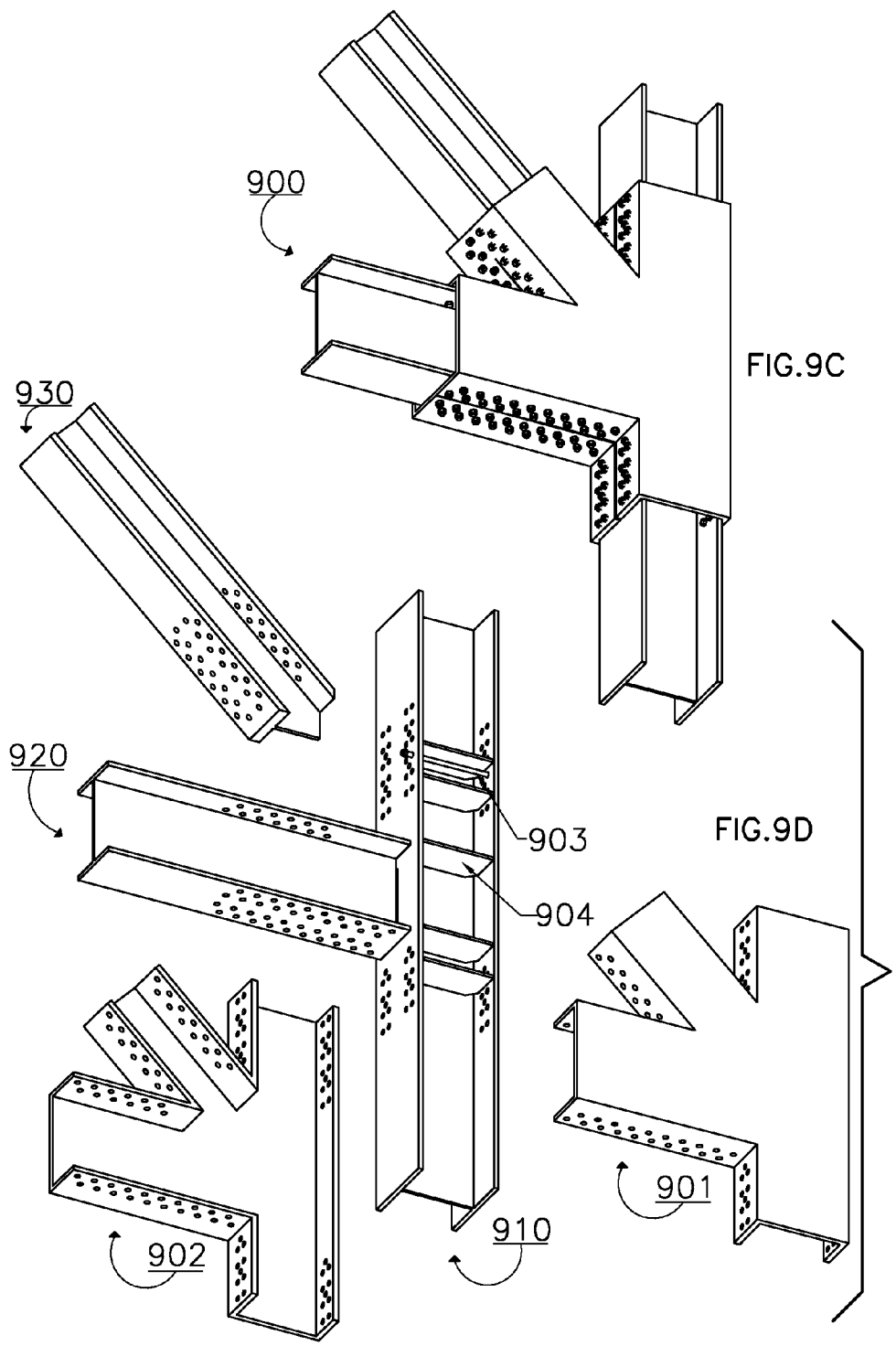

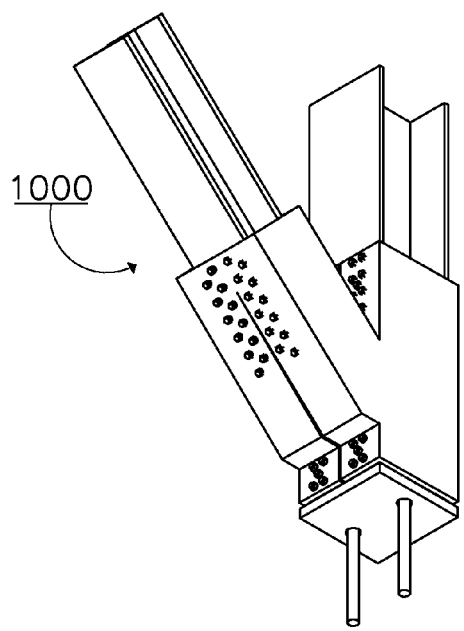
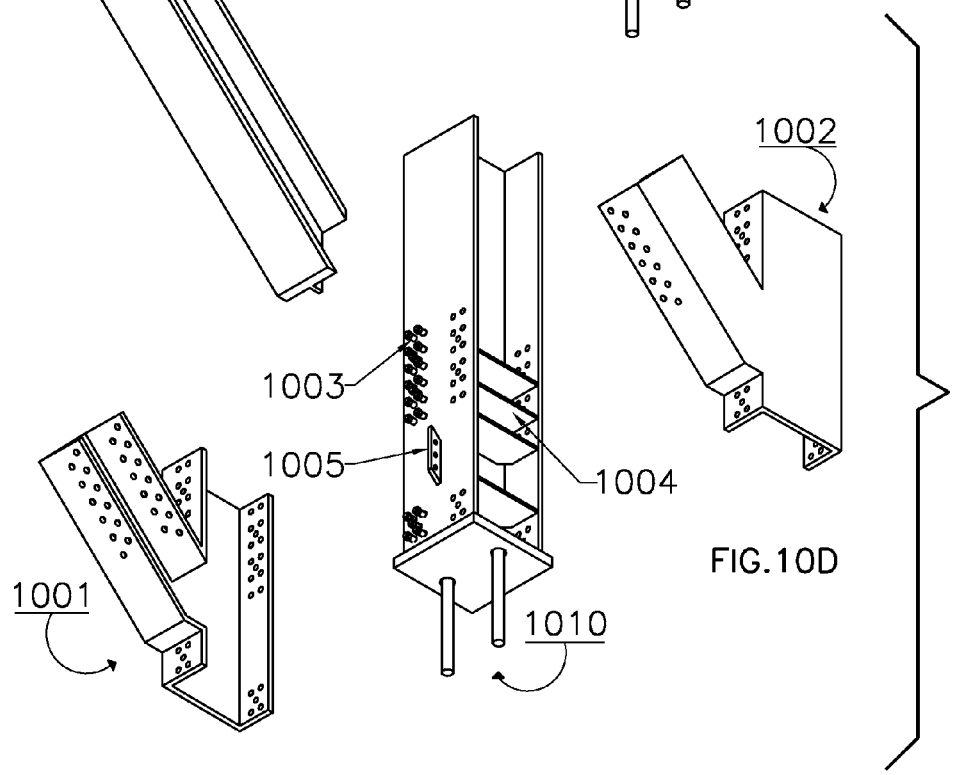

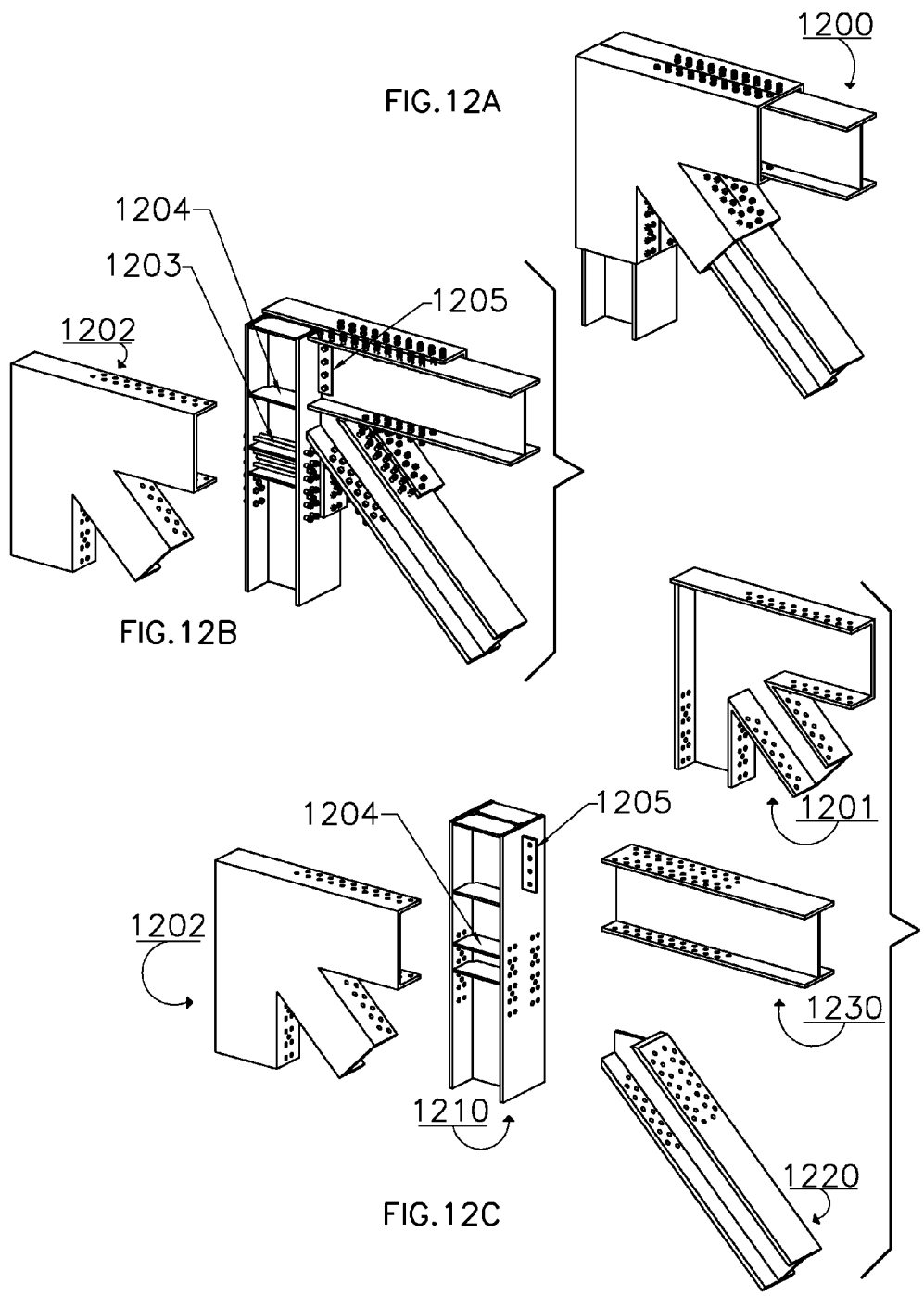

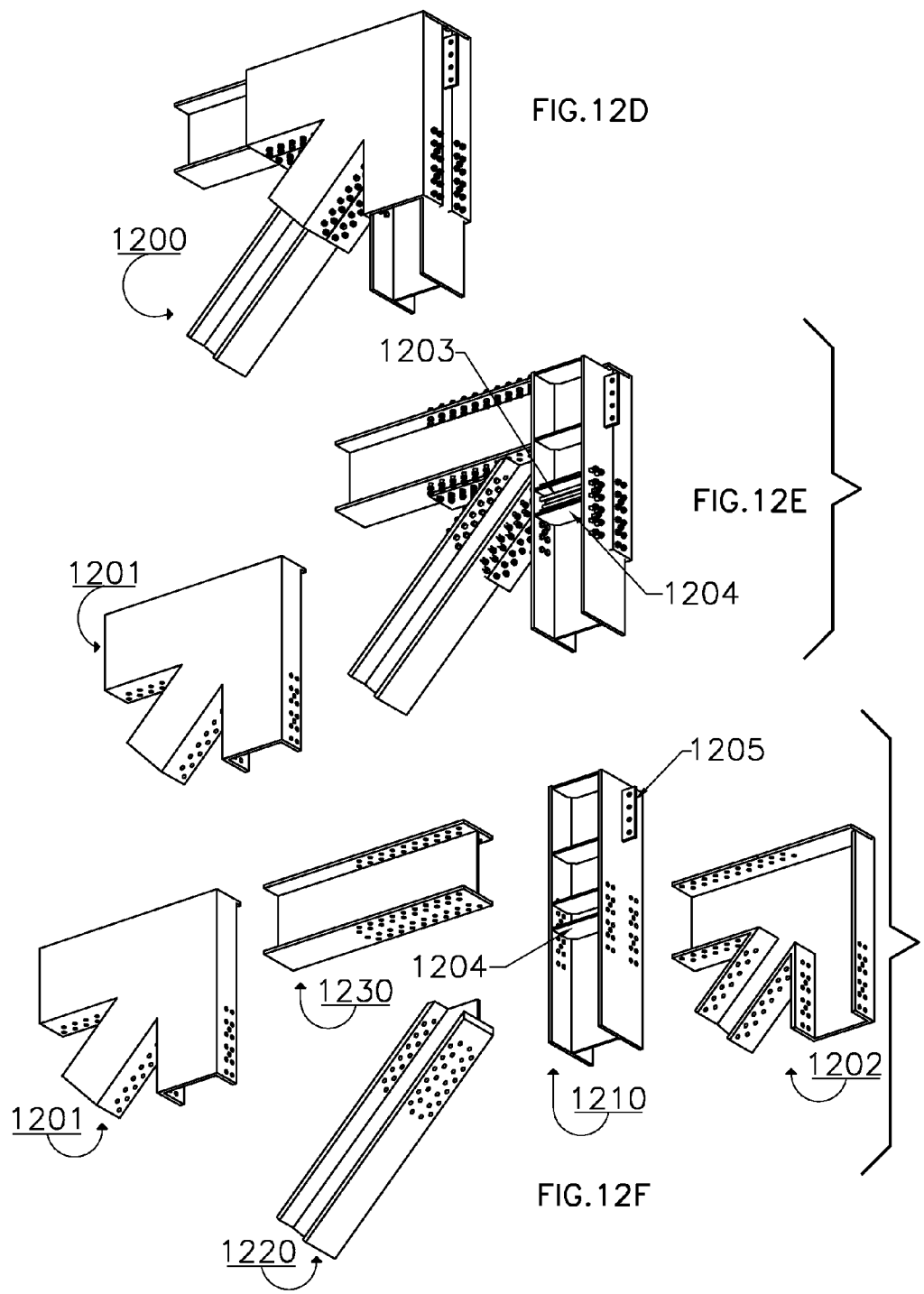

BOLTED STEEL CONNECTIONS WITH 3-D JACKET PLATES AND TENSION RODS

CROSS-REFERENCE TO RELATED APPLICATIONS

This application claims the benefit of priority as a continuation-in-part to U.S. patent application Ser. No. 12/804,602, filed on Apr. 19, 2010, entitled BOLTED STEEL CONNECTIONS WITH 3-D JACKET PLATES AND TENSION RODS, by WeiHong Yang, the contents of which are hereby incorporated by reference in its entirety.

FIELD OF THE INVENTION

The present invention relates generally, to construction material, and more specifically, to a steel jacket plate connector.

BACKGROUND

During construction of steel frames and trusses, individual members such as beams and columns are connected together to form a structure. Conventionally, two-dimensional gusset plates are used to connect steel members with either welding or bolts, or their combinations.

However, connecting steel beams requires a degree of physical fitness and expertise that can make it a difficult job. Typically, each connection is custom fit on site while steel members are held in place. The labor cost of welders assembling connectors on site can be prohibitive. Moreover, the time to construct a structure is lengthened by the connections because adjacent members cannot be added until a supporting member is secured.

What is needed is a technique to allow faster and lower cost installation of connections.

SUMMARY OF THE INVENTION

The above needs are met by an apparatus, system, method and method of manufacture for a three-dimensional jacket-plate connector.

In one embodiment, the 3-D connector comprises first three-dimensional jacket plate. A second three-dimension jacket plate that is a mirror image of the first three-dimensional jacket plate. The two jacket plates are bolted to opposite sides of a joint of the steel I-beam members.

In another embodiment, a jacket plate comprises a primary c-channel welded to a connecting c-channel that intersect to match angles of the joint formed by a primary I-beam member and a connecting I-beam member.

Advantageously, the 3-D jacket connection can achieve exceptional structural performance, including higher strength and ductility, stronger yet simpler connections, higher quality, small components for easy storage and transportation. It also provides easy installation to increase the speed and reduce the price of erecting steel structures. The 3-D jacket connection addresses all possible connection type in such a simple and yet consistent manner that it is practically a versatile connections system that can be use in any steel frames and trusses that is made of wide-flanged steel I-beam sections.

BRIEF DESCRIPTION OF THE FIGURES

In the following drawings like reference numbers are used to refer to like elements. Although the following figures depict various examples of the invention, the invention is not limited to the examples depicted in the figures.

FIGS. 9A-D are schematic diagrams illustrating a moment connection of an EBF and an inverted V SCBF, brace and beam to column connection, of the steel frame of FIG. 1D, and the similar connections of the steel truss of FIG. 2C, according to some embodiments.

FIGS. 10A-D are schematic diagrams illustrating a moment connection of an EBF and an inverted V SCBF, brace and column connection at a foundation, of the steel frame of FIG. 1B, according to one embodiment.

FIGS. 12A-F are schematic diagrams illustrating a moment connection of an SCBF, brace and beam to column connection at a top floor, of the steel frame of FIG. 1E, according to some embodiments.

DETAILED DESCRIPTION

An apparatus, system, method, and method of manufacture for a three-dimensional jacket-plate connector to connect at least two members that are wide-flanged steel I-beam sections, are described herein. The following detailed description is intended to provide example implementations to one of ordinary skill in the art, and is not intended to limit the invention to the explicit disclosure, as one of ordinary skill in the art will understand that variations can be substituted that are within the scope of the invention as described.

System Overviews (FIGS. 1 and 2)

Figure 1A:
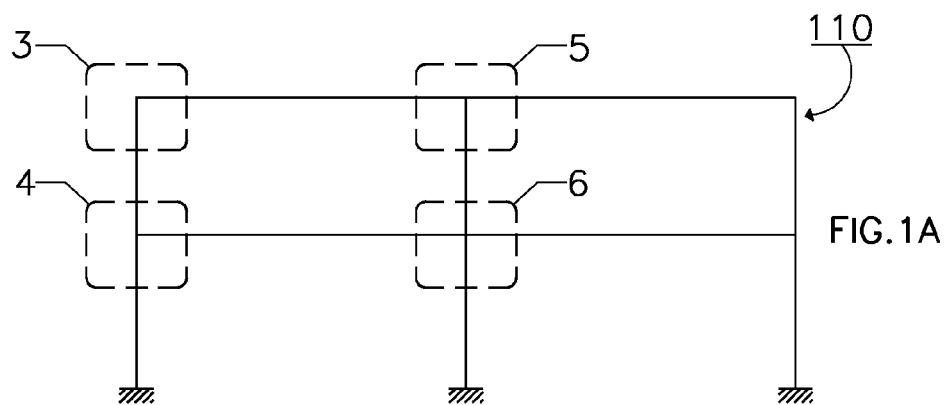
FIGS. 1A-E are schematic diagrams illustrating steel frames, according to some embodiments.
Figure 1B:
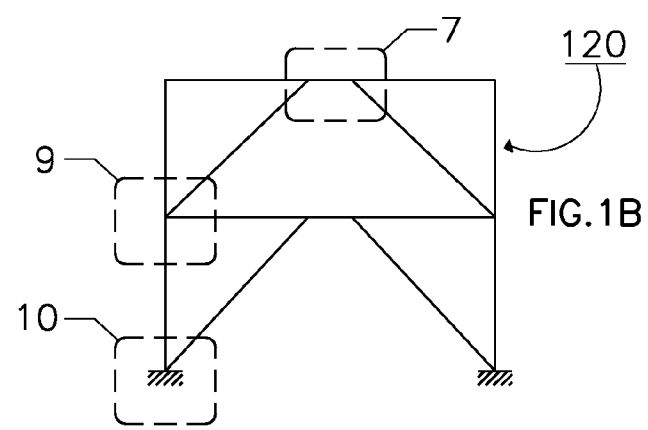
Figure 1C:
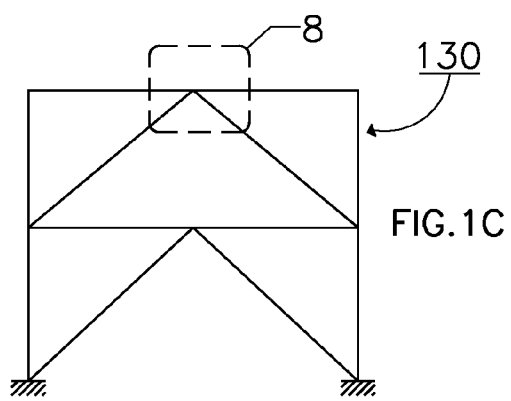

FIGS. 1A-E are schematic diagrams illustrating steel frames, according to some embodiments. The steel frames are composed of steel I-beam sections that connect at a joint. The label numbers associated with the joints in FIGS. 1A-E correspond to figure numbers that further detail the joint. More particularly, FIG. 1A shows a steel frame with moment connections 3, 4, 5 and 6 further detailed in FIGS. 3A-B, 4A-B, 5A-B and 6A-B; FIG. 1B shows an eccentrically braced frame (EBF) with moment connections 7, 9 and 10, further detailed in FIGS. 7A-D, 9A-D and 10A-D, respectively; and FIG. 1C shows a specially concentrically braced frame (SCBF) with a moment connection 8 further detailed in FIG. 8A-D.

Figure 2A:
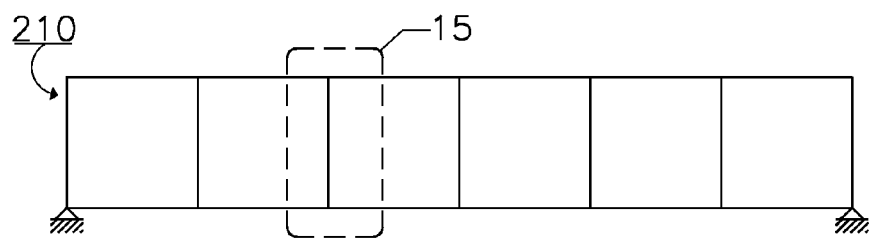
FIGS. 2A-D are schematic diagrams illustrating steel trusses, according to some embodiments.
Figure 2B:
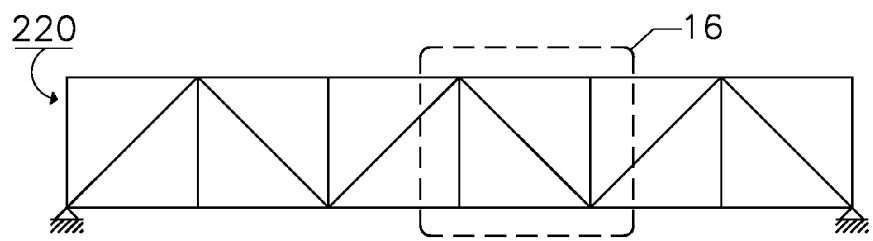
Figure 2C:
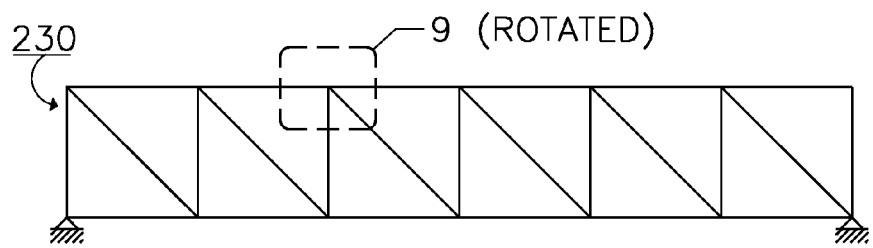

FIGS. 2A-D are schematic diagrams illustrating steel trusses, according to some embodiments. The label numbers associated with the joints in FIGS. 2A-D correspond to figure numbers that further detail the joint. Specifically, FIG. 2A illustrates a Vierendeel truss connection condition 15 further detailed in FIGS. 15A-C, FIG. 2B shows a steel bridge truss segment further detailed in FIGS. 16A-B, FIG. 2C shows an EBF and an inverted V SCBF with a moment connection 9 further detailed in FIGS. 9A-D, and FIG. 2D shows a steel truss with a connection 8 further detailed in FIGS. 8A-D.

Individual 3-D Connector and Accessory Details

Figure 3A:
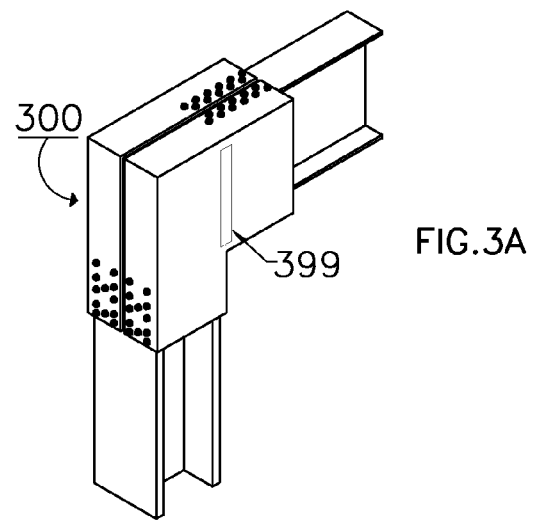
FIGS. 3A-B are schematic diagrams illustrating a moment connection at a top floor, corner condition, of the steel frame of FIG. 1A, according to some embodiments.
Figure 3B:
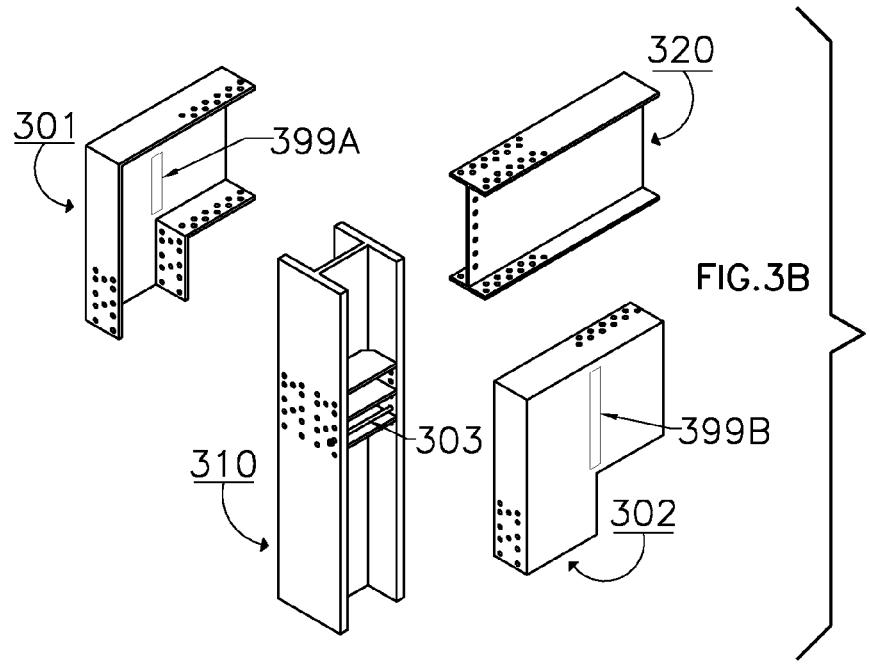

FIGS. 3A-B are schematic diagrams illustrating a moment connection 300 at a top floor, corner condition, of the steel frame of FIG. 1A, according to some embodiments. FIG. 3A shows the moment connection 300 as assembled in the field, while FIG. 3B is an exploded view. The moment connection 300 is an (L)-shaped connection. The top floor corner 300 includes a 3-D connection between, for example, a post 310 and a beam 320 (also generically referred to as members herein). The 3-D connection includes 3-D jacket plates 301, 302, which are mirror images to each other.

The post 310 and beam 320 are configured as I-beams or I-beam sections (i.e., two opposing flanges connected by a web). The members 310, 320 are composed of construction-grade steel, or any appropriate material. The sizes are variable. In some embodiments, the post 310 and beam 320 are different sizes because the post 310 typically supports a load of greater magnitude.

The 3-D jacket plates 301, 302 are composed of, for example, steel. The plates 301, 302 can be substantially identical and mirrored for attachment to opposite sides of the joint. The plates can be pre-fabricated off site to match sizes and strength requirements of the structure. Common sizes can be mass produced in a manufacturing facility. The 3-D jacket plates 301, 302 can be formed from c-channels having a web (or side) plate welded to two flange (or clamping) plates. Alternatively, the 3-D jacket plates 301, 302 can be formed from a side plate in the shape of a joint (i.e., (L)-shaped) and clamping plates welded around a perimeter of the side plate at, for example, a perpendicular angle.

In some embodiments, formation or manufacture of the 3-D jacket plates 301, 302 begins with a primary c-channel which can correspond to a primary member continued through joint. A connecting c-channel corresponding to a connecting member (i.e., the beam 320) can be welded to the primary c-channel. The primary member can be a load carrying member of a connection (i.e., the post 310), and the connecting member (i.e., the beam 320) can transfer its load to the primary member. The c-channels radiate away from the joint in the direction matching the members 310, 320. A sidewall portion of the primary c-channel (i.e., portion of flange or clamping plate) can be notched out to weld a primary c-channel web to a connecting c-channel web. The notch accommodates flanges of the connecting member when installed. The connecting member transfers forces to the primary member through the pair of 3-D jacket plates 301, 302.

Bolts can be used to connect the 3-D jacket plates 301, 302 to members. In one embodiment, a pre-drilled pattern is provided to allow faster installations. Configuration of c-channels of the 3-D jacket plates 301, 302 relative to connecting I-beam member 320 allows an installer to fit a hand with a fastening tool into a box gap afforded by opposing flanges of the I-beam and the webs of the c-channel and the I-beam.

One or more tension rods 303 installed across the depth (i.e., through-the-depth steel rods) of the post 310, in some embodiments, provide additional strength to the primary c-channel of the 3-D jacket plates 301, 302. Although the tension rods 303 are shown as connected to the post 310, this is merely for the purpose of illustration. As installed, the tension rods 303 are connected to the outer portions of the 3-D jacket plates 301, 302 to reinforce against moment forces. More specifically, the vertical shear force is transferred from the beam 320 to the post 310 through a shear tag similar to those of 505 and 605, the rotational moment force is completely transferred, from the beam 320 to the post 310, through the 3-D jacket plates 301, 302. The tension rods 303 help to transfer horizontal shear force associated with the moment force, through an inner flange, to the web of the post 310. In other word, the tension rods 303 reinforce the connector plates 301, 302 from being pulled away from the outer flange.

Stiffener (or web stiffener) plates 304 in the post 310, of other embodiments, provide additional strength to the continued primary I-beam 310. One more stiffener plates 304 are dispersed as needed. The stiffener plates 304, coupled with the tension rods 304, help in transferring bending moment and shear force across the connection.

Figure 4A:
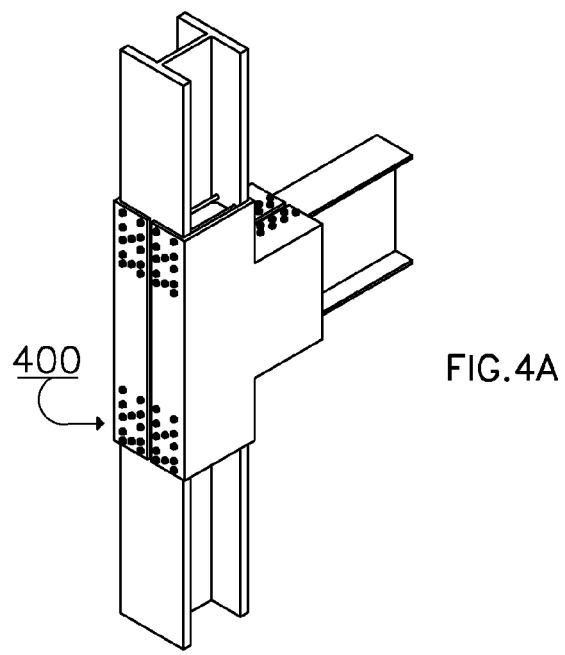
FIGS. 4A-B are schematic diagrams illustrating a moment connection at an intermediate floor, side condition, of the steel frame of FIG. 1A, according to some embodiments.
Figure 4B:
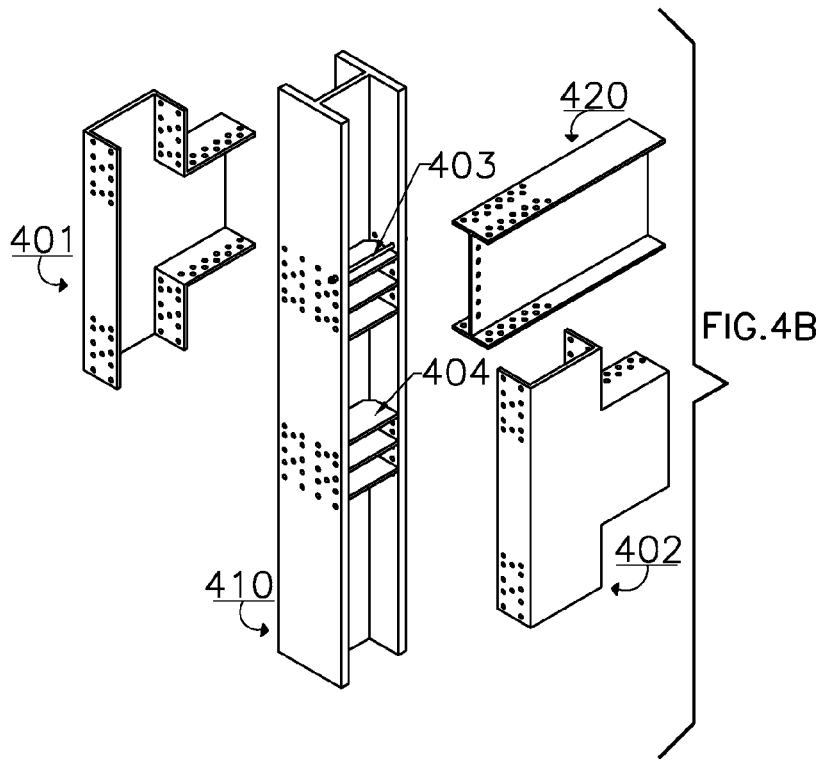

FIGS. 4A-B are schematic diagrams illustrating a moment connection 400 at an intermediate floor, side condition, of the steel frame of FIG. 1A, according to some embodiments.

In this embodiment, the jacket plates 401, 402 have a (T)-shape (rotated), and are substantially mirror in configuration. As an intermediate floor connection, a beam 420 that is supported by a post 410 which continues vertically to provide support for members at higher elevations, such as a top floor or a roof.

The jacket plates 401, 402 have a primary c-channel corresponding to the post 410 and a connecting c-channel corresponding to the beam 420. One way to form the jacket plates 401, 402 is to notch out a flange (or clamping) plate of the primary c-channel to allow accommodation for the flanges of beam 420.

Tension rods 403 and stiffener plates 404 are placed to counteract the moment force generated by member 420. Both upper and lower reinforcement are used against both the clockwise and counter clockwise potential rotation of member 420. A shear tag (similar to those of 505 and 605, but not shown) can also be included.

Figure 5A:
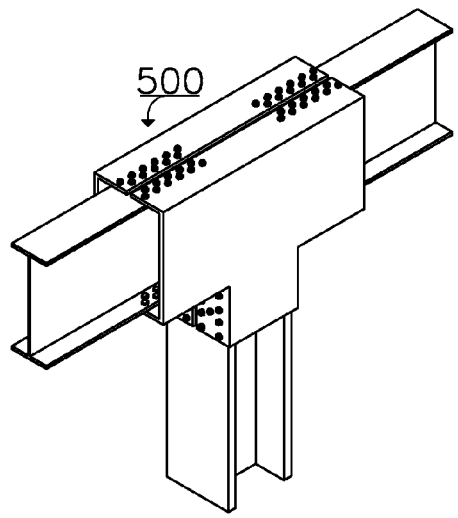
FIGS. 5A-B are schematic diagrams of a moment connection at a top floor, interior bay condition, of the steel frame of FIG. 1A, according to some embodiments.
Figure 5B:
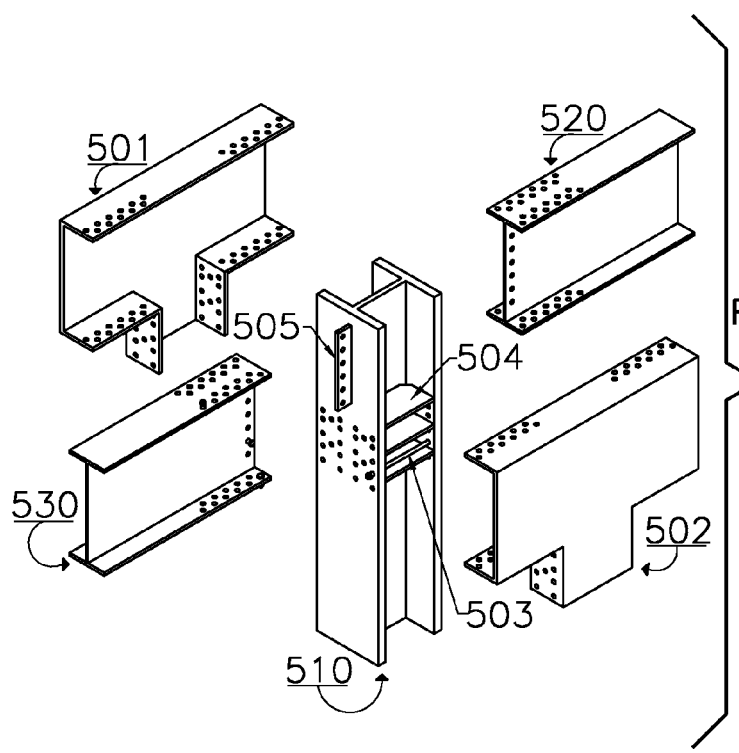

FIGS. 5A-B are schematic diagrams of a moment connection 500 at a top floor, interior bay condition, of the steel frame of FIG. 1A, according to some embodiments.

In this embodiment, the jacket plates 501, 502 have a (T)-shape, and are substantially mirror in configuration. Relative to the moment connection 400 of FIG. 4, the moment connection 500 supports beams on either side of a post rather than at different vertical elevations. Further, tension rods 503 and stiffener plates 504 are dispersed only below the joint. A shear tag 505 is provided to transfer vertical shear forces from I-beam 530 to the post 510. The rotational moment force is completely transferred, from the beams 520 and 530 to the post 510, through the 3-D jacket plates 501, 502.

Figure 6A:
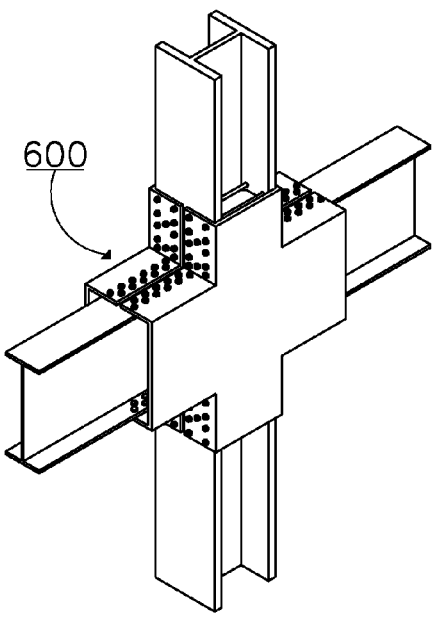
FIGS. 6A-B are schematic diagrams illustrating a moment connection at an intermediate floor, interior bay condition, of the steel frame of FIG. 1A, according to some embodiments.
Figure 6B:
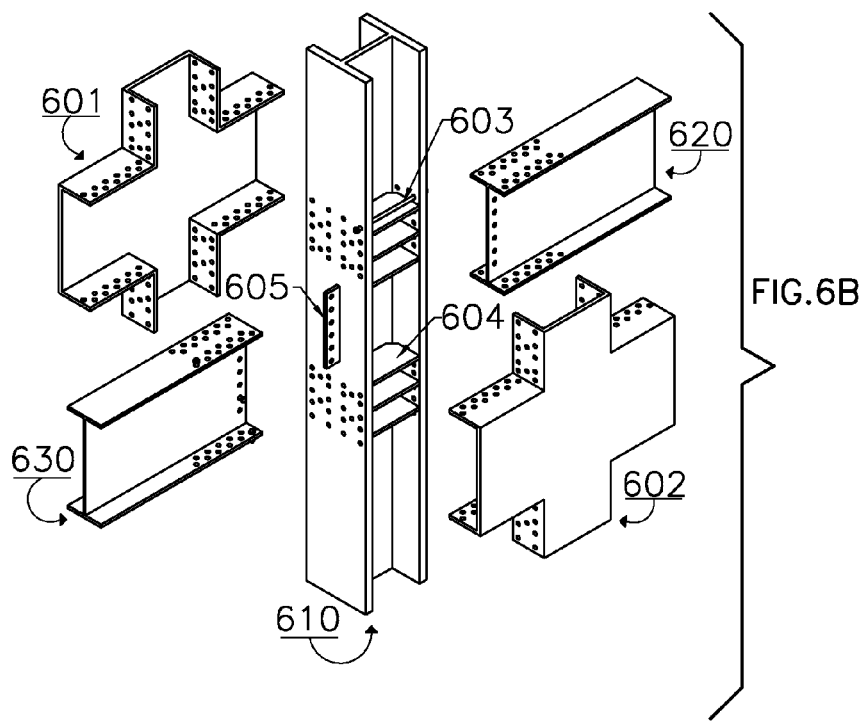
Figure 7A:
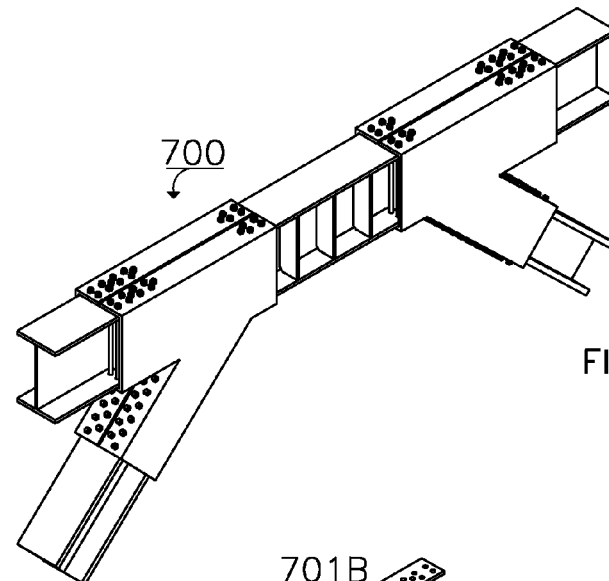
FIGS. 7A-D are schematic diagrams illustrating a moment connection of an eccentrically braced frame (EBF), of the steel frame of FIG. 1B, according to some embodiments.
Figure 7B:
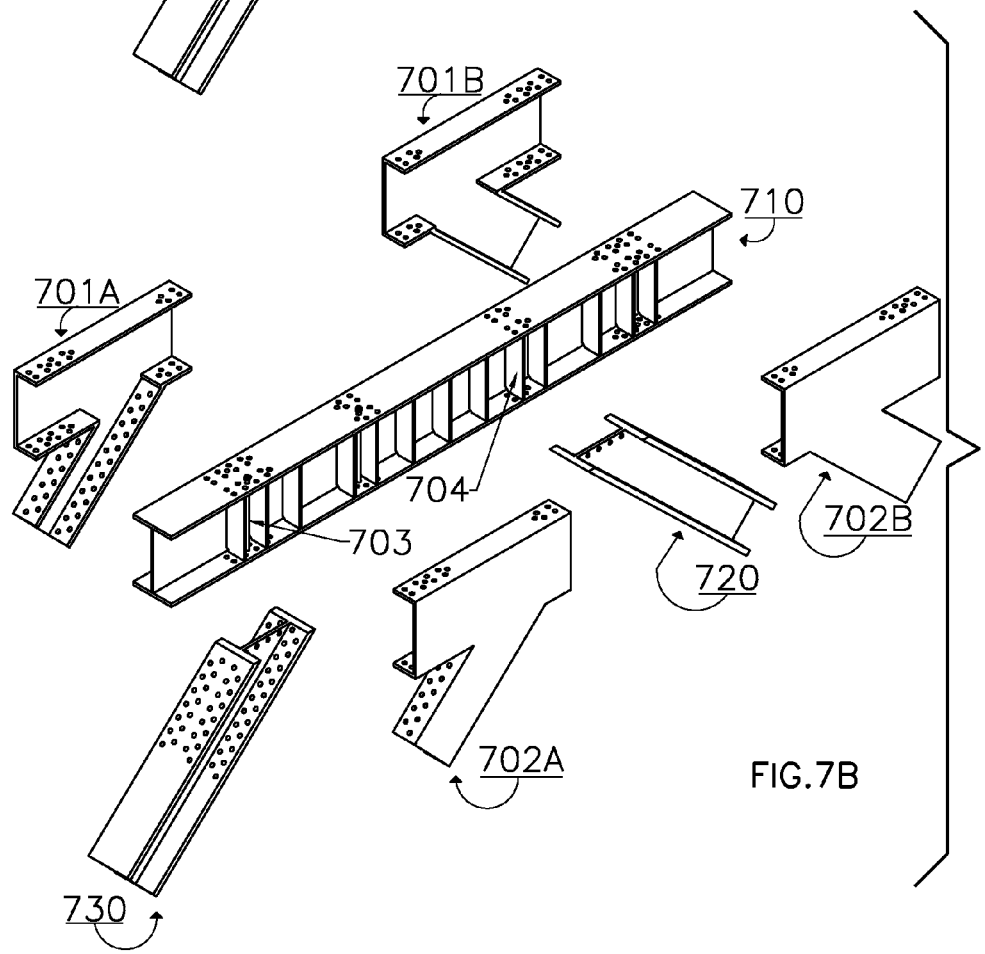
Figure 7C:
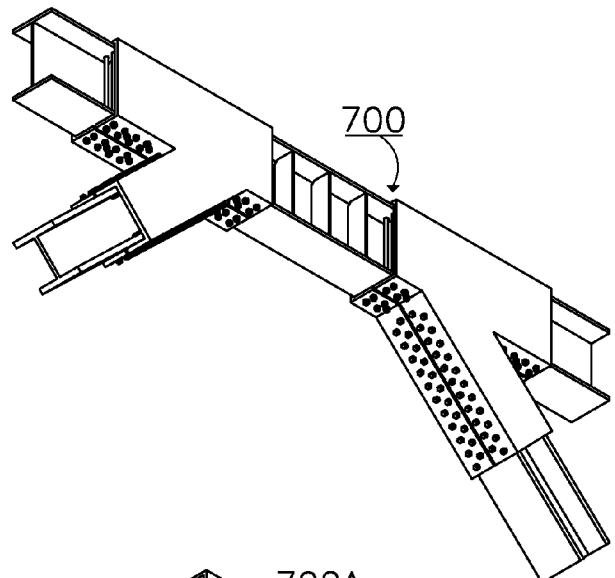
Figure 7D:
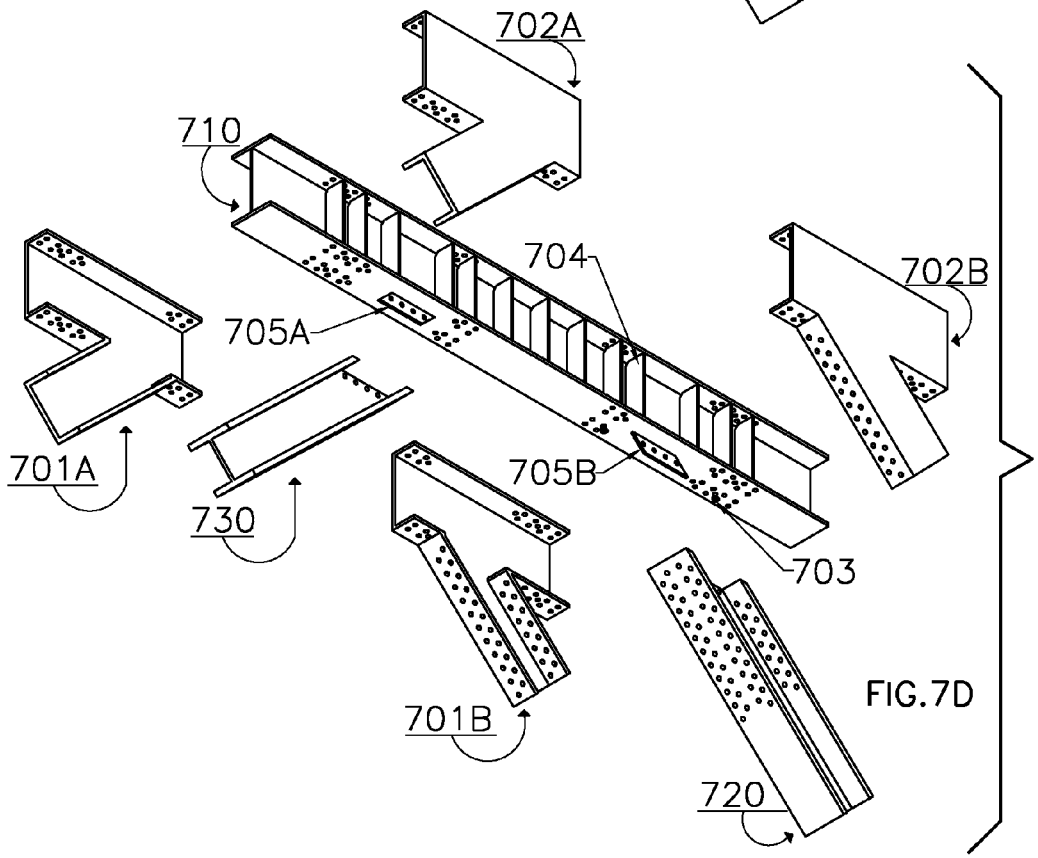
Figure 8A:
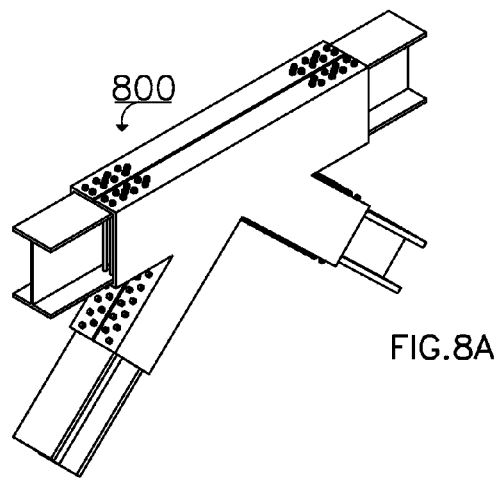
FIGS. 8A-D are schematic diagrams illustrating a moment connection of special concentrically braced frame (SCBF), of the steel frame of FIG. 1C, and the similar connections of the steel truss of FIG. 2D, according to some embodiments.
Figure 8B:
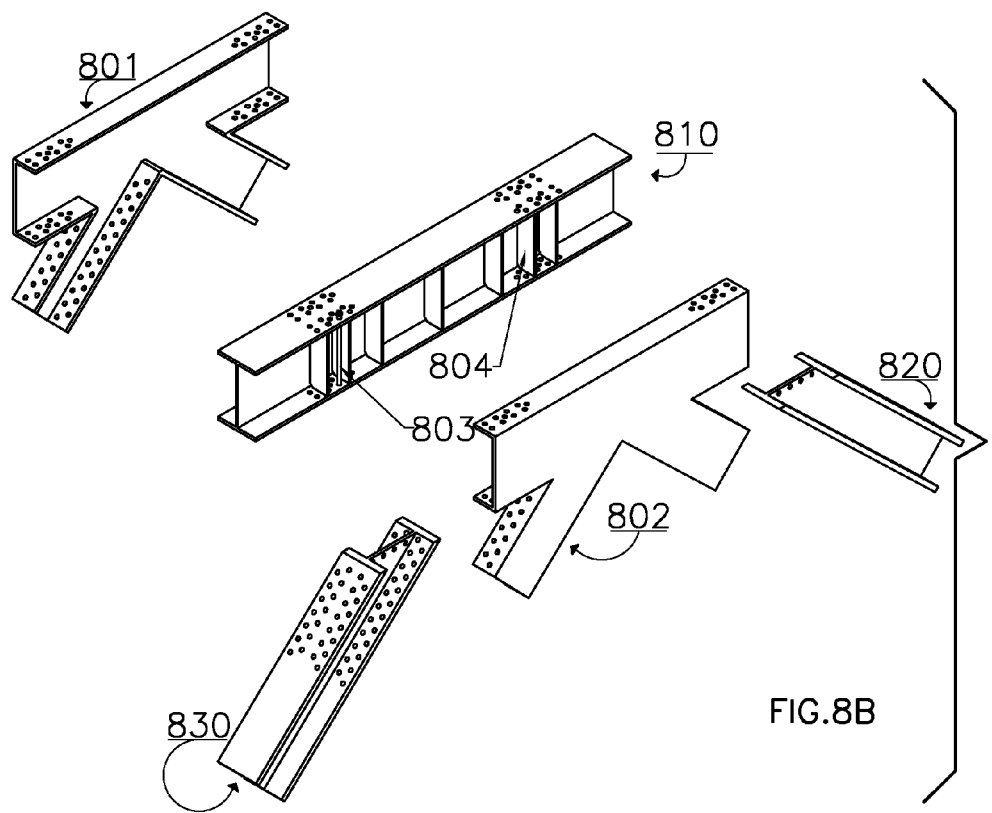
Figure 8C:
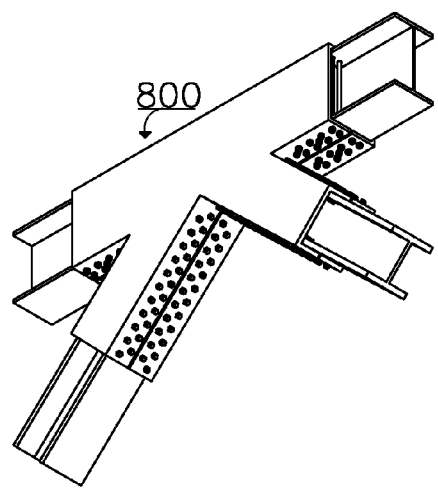
Figure 8D:
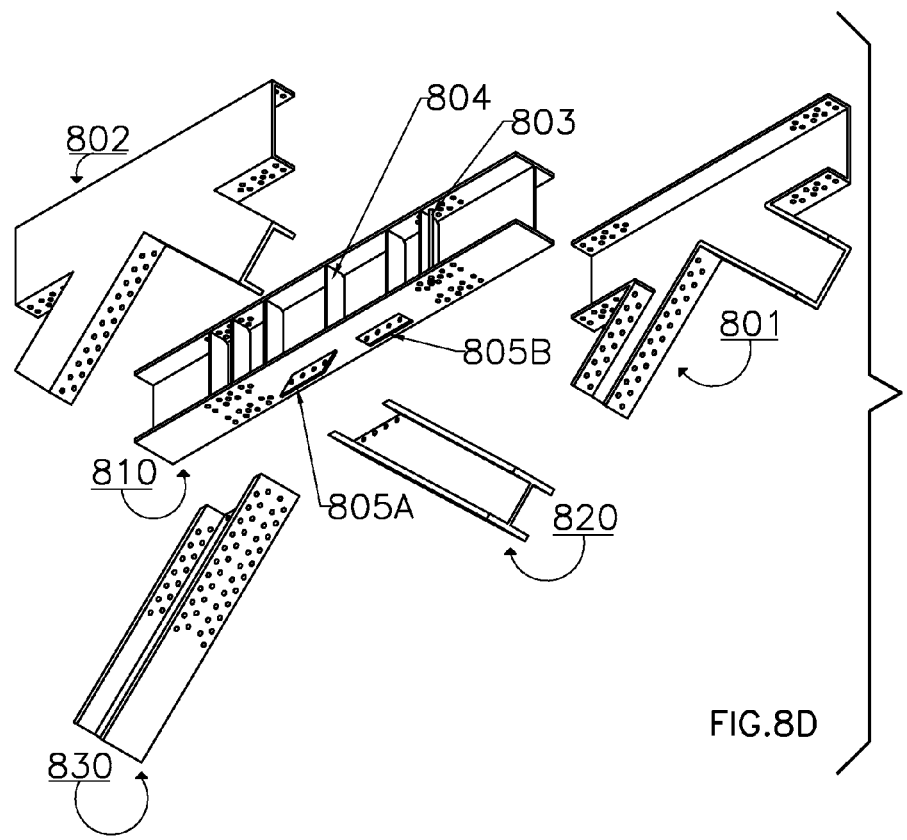
Figures 9A, 9B:
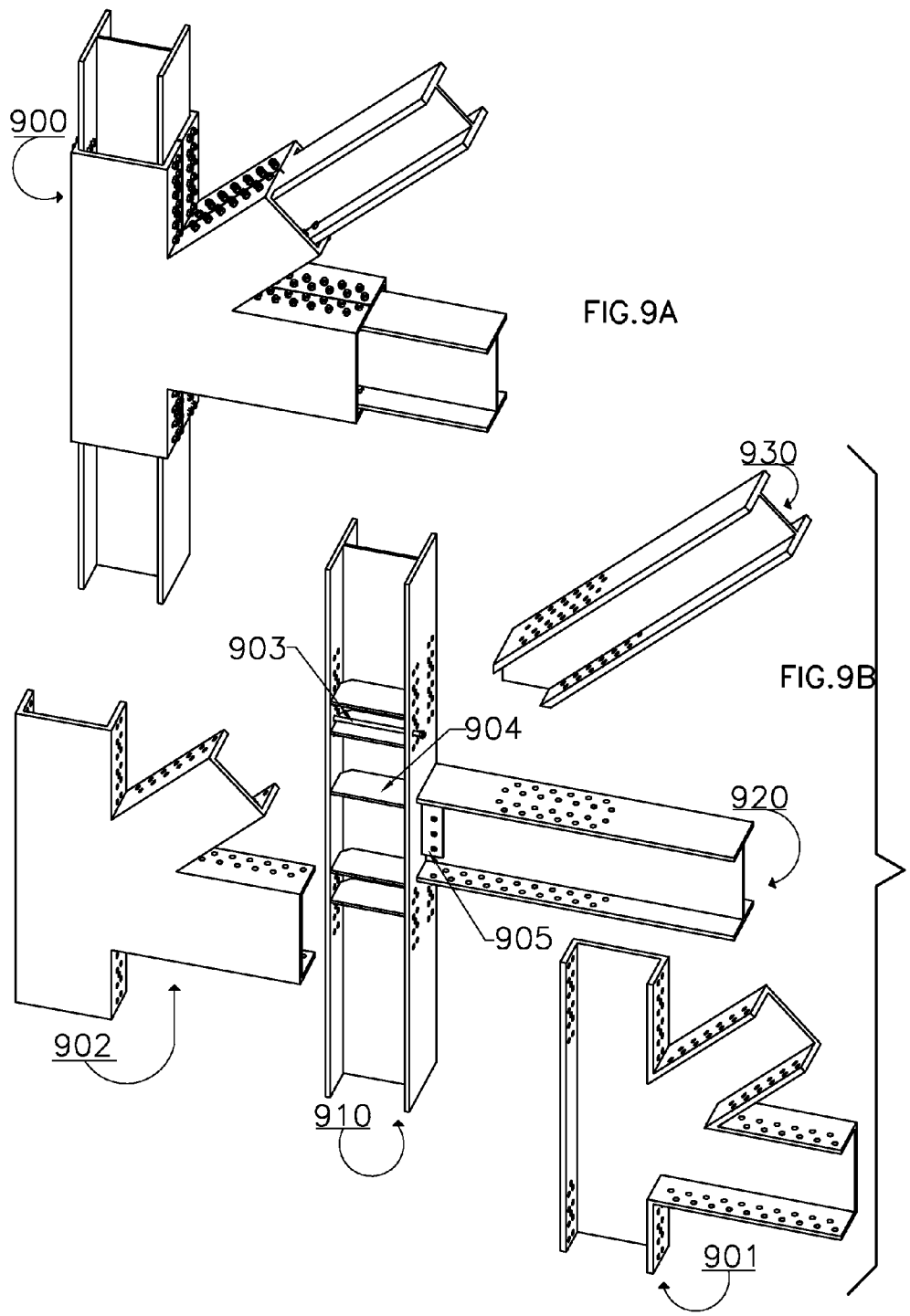
Figure 10A:
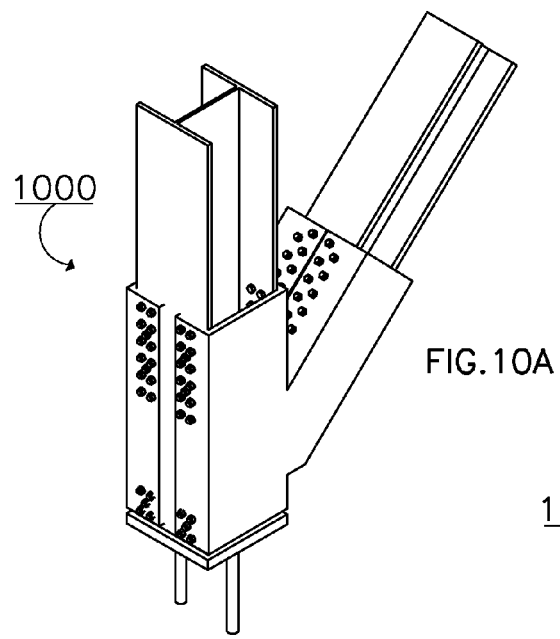
Figure 10B:
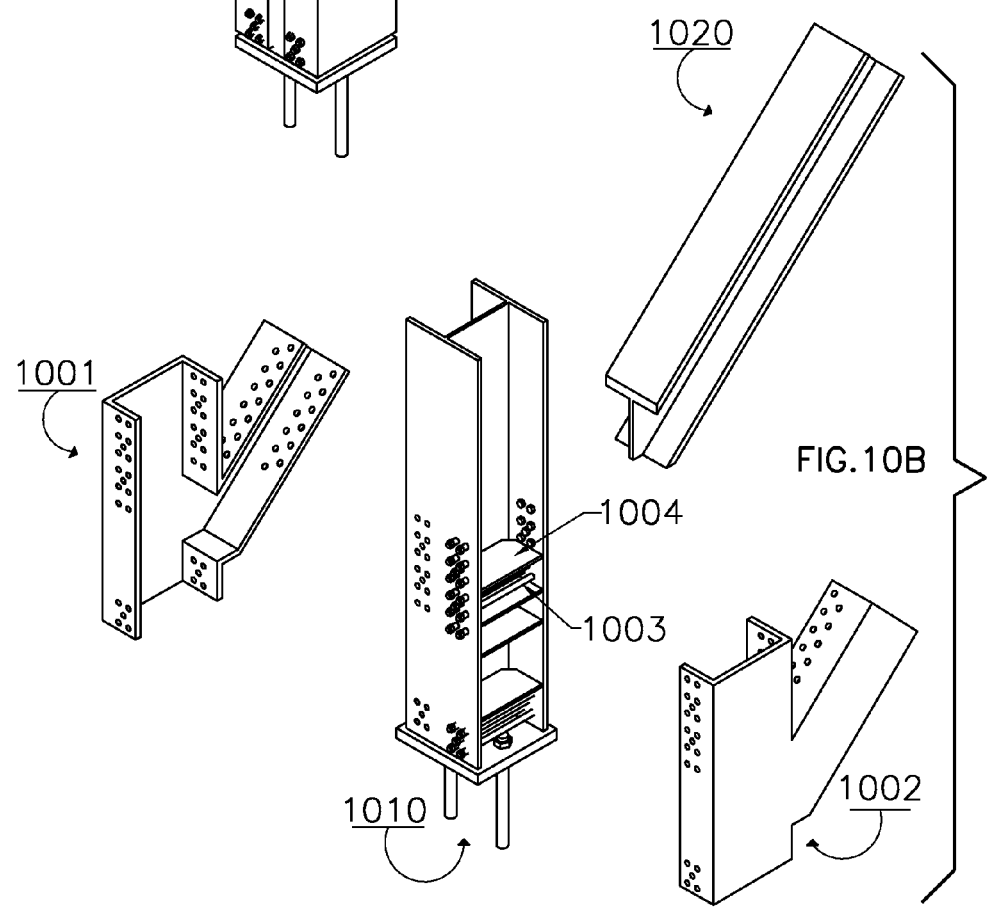
Figures 11A, 11B:
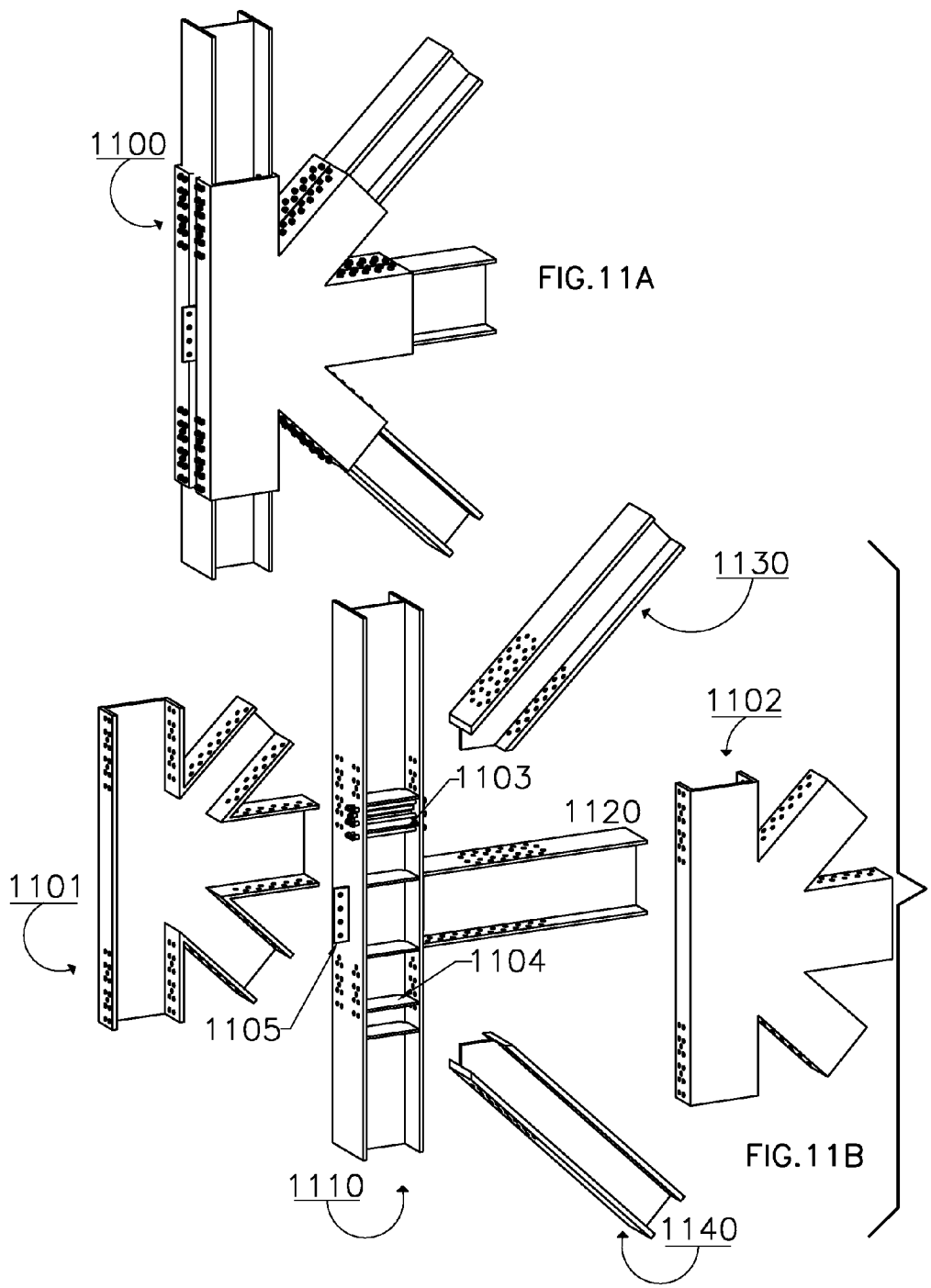
FIGS. 11A-D are schematic diagrams illustrating a moment connection of an SCBF, braces and beam to column connection at a floor, of the steel frame of FIG. 1D, according to one embodiment.
Figure 11C:
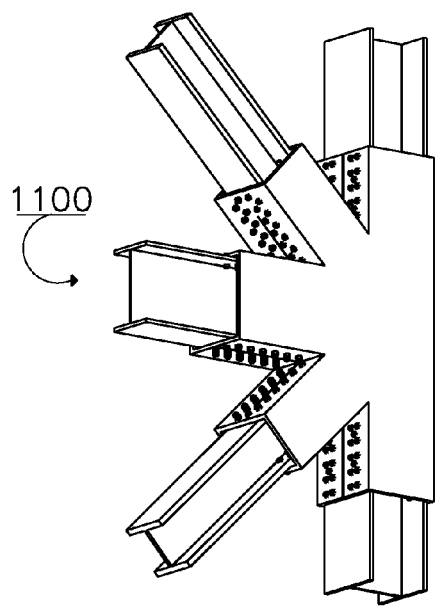
Figure 11D:
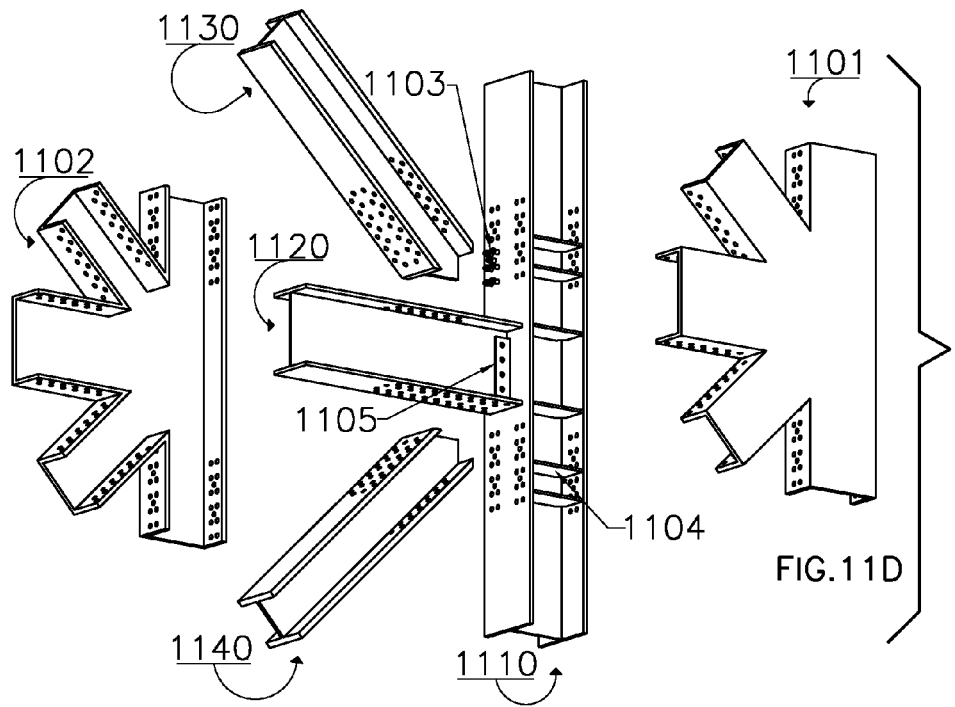

FIGS. 6A-B are schematic diagrams illustrating a moment connection 600 at an intermediate floor, interior bay condition, of the steel frame of FIG. 1A, according to some embodiments.

In this embodiment, the jacket plates 601, 602 have a (+)-shape, and are substantially mirror in configuration. In this implementation, the moment connection 600 supports beams 620, 630 on either side of a post 610 and at different vertical elevations. Here, upper and lower reinforcements are in place. Specifically, tension rods 603, stiffener plates 604 and a shear tag 605 are shown.

Additional variations are possible which do not have 90 degree angle joints and have more than two members. The angles can be 45, 30 or 60 degrees, or any angle needed for a structure. In FIGS. 7-16, numbering labels are consistent with the earlier figures in that connector plates label numbers start with the figure number and end with 01 and 02, tension rods end with 03, web stiffeners end with 04, and shear tags end with 05.

In particular, FIGS. 7A-D are schematic diagrams illustrating a moment connection 700 of an eccentrically braced frame (EBF), of the steel frame of FIG. 1B, according to some embodiments. In this embodiment, the jacket plates 701A, 702A, 701B and 702B have a (y)-shape (rotated), and are substantially mirror in configuration.

Figure 2D:
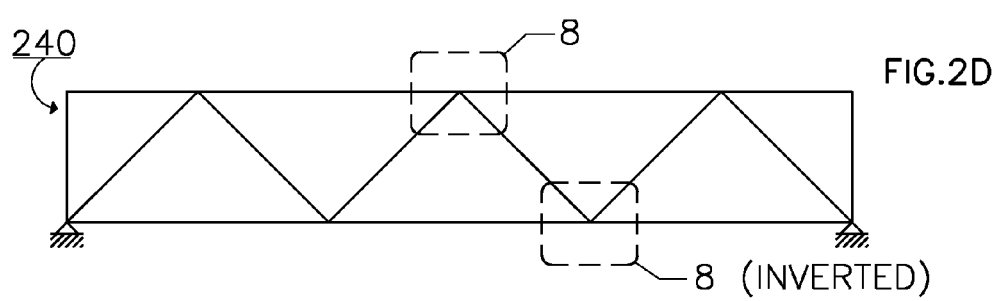

FIGS. 8A-D are schematic diagrams illustrating a moment connection 800 of a special concentrically braced frame (SCBF), of the steel frame of FIG. 1C of the steel truss of FIG. 2D, according to some embodiments. In this embodiment, the jacket plates 801 and 802 have the shape of a combination of two rotated and mirrored (y)-shapes, and are substantially mirror in configuration.

FIGS. 9A-D are schematic diagrams illustrating a moment connection 900 of an EBF and an inverted V SCBF, brace and beam to column connection, of the steel frame of FIG. 1B and the steel truss of FIG. 2C, according to some embodiments. In this embodiment, the jacket plates 901 and 902 have the shape of a combination a rotated (T) and (y), and are substantially mirror in configuration.

FIGS. 10A-D are schematic diagrams illustrating a moment connection 1000 of an EBF and an inverted V SCBF, brace and column connection at a foundation, of the steel frame of FIG. 1B, according to one embodiment. In this embodiment, the jacket plates 1001 and 1002 have a tilted (V)-shape, and are substantially mirror in configuration.

Figure 1D:
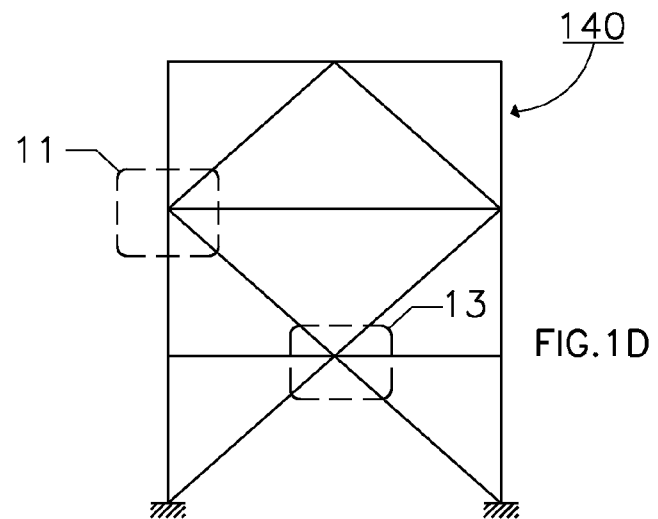

FIGS. 11A-D are schematic diagrams illustrating a moment connection 1100 of an SCBF, brace and beam to column connection at a floor, of the steel frame of FIG. 1D, according to one embodiment. In this embodiment, the jacket plates 1101 and 1102 have the shape of a combination of a (K)-shape and a rotated (T)-shape, and are substantially mirror in configuration.

Figure 1E:
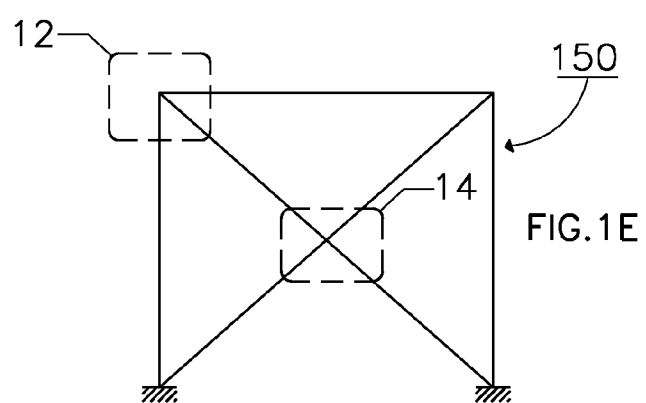

FIGS. 12A-F are schematic diagrams illustrating a moment connection 1200 of an SCBF, brace and beam to column connection at a top floor, of the steel frame of FIG. 1E, according to some embodiments. In this embodiment, the jacket plates 1201 and 1202 have the shape of a combination of a rotated (L)-shape and rotated (V)-shape, and are substantially mirror in configuration.

Figure 13A:
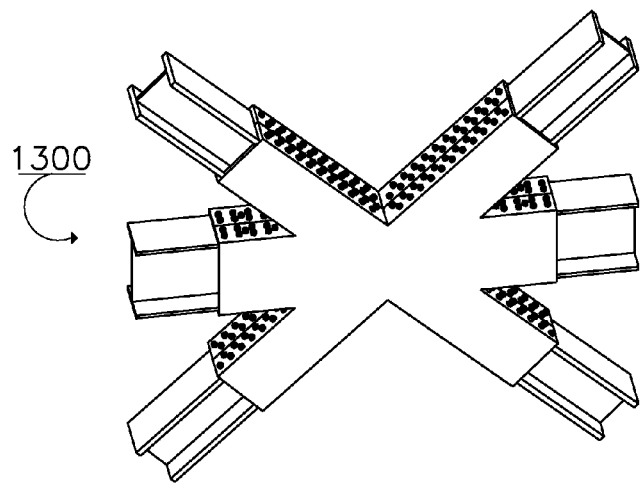
FIGS. 13A-B are schematic diagrams illustrating a moment connection of an SCBF, brace and beam crossing connection, of the steel frame of FIG. 1D, according to some embodiments.
Figure 13B:
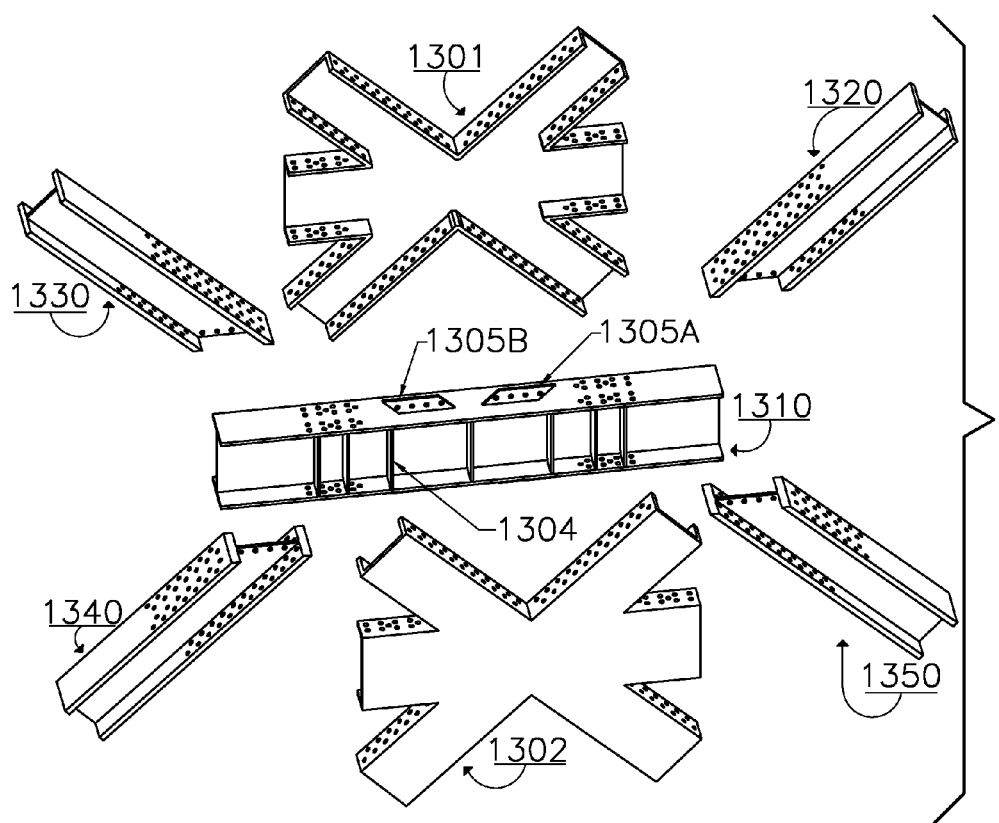

FIGS. 13A-B are schematic diagrams illustrating a moment connection 1300 of an SCBF, brace and beam crossing connection, of the steel frame of FIG. 1D, according to some embodiments. In this embodiment, the jacket plates 1301 and 1302 have a rotated back-to-back dual (K)-shape, and are substantially mirror in configuration.

Figure 14A:
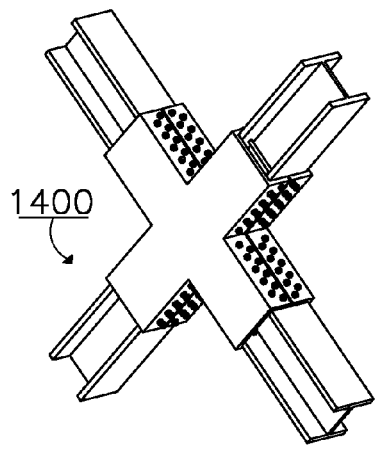
FIGS. 14A-C are schematic diagrams illustrating a moment connection of an SCBF, brace crossing connection without beam condition, of the steel frame of FIG. 1E, according to some embodiments.
Figure 14B:
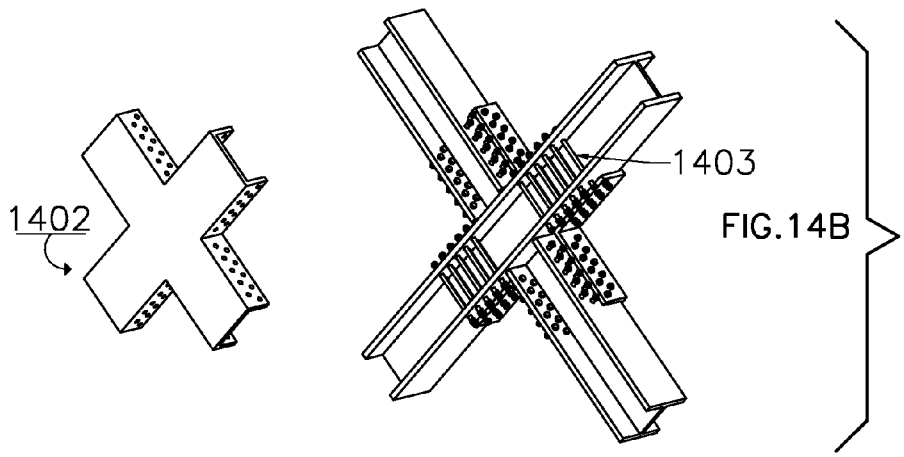
Figure 14C:
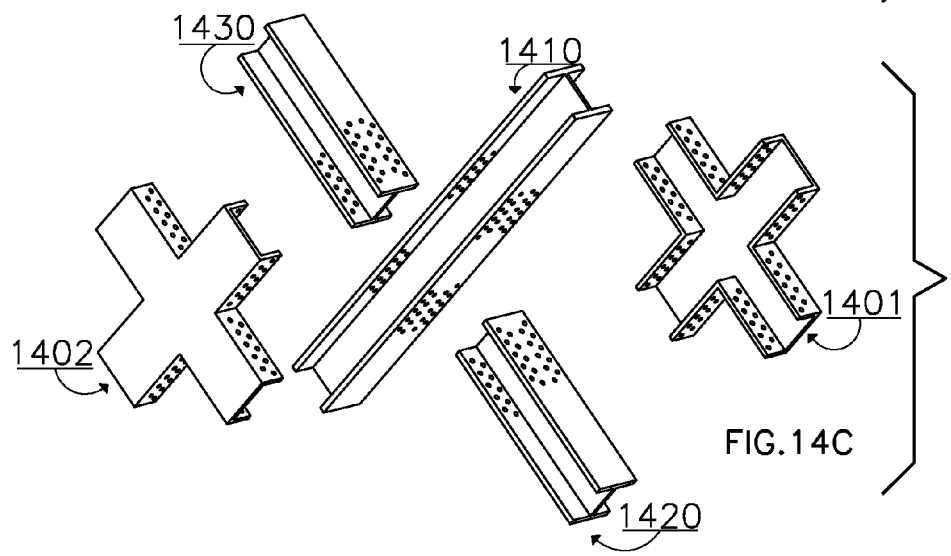

FIGS. 14A-C are schematic diagrams illustrating a moment connection 1400 of an SCBF, brace crossing connection without beam condition, of the steel frame of FIG. 1E, according to some embodiments. In this embodiment, the jacket plates 1401 and 1402 have a (X)-shape, and are substantially mirror in configuration.

Figure 15A:
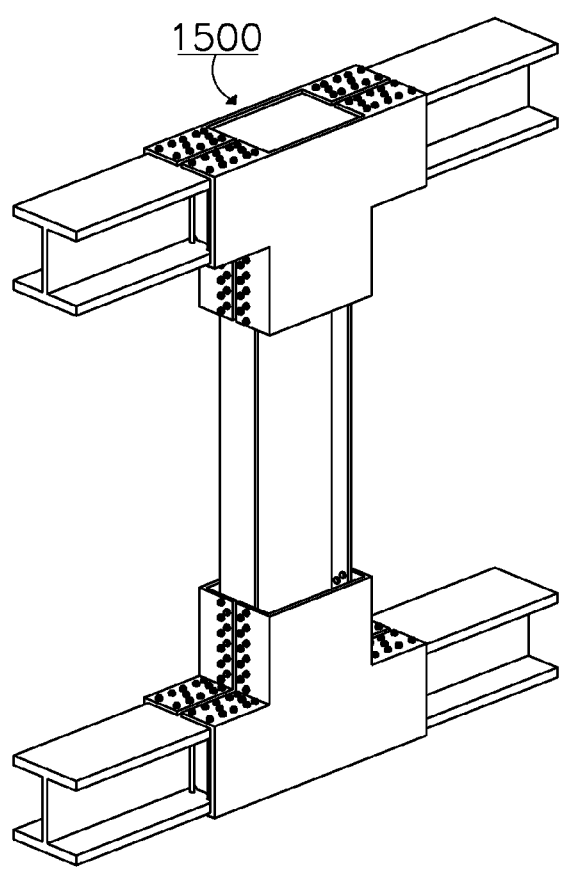
FIGS. 15A-C are schematic diagrams illustrating a Vierendeel truss, connection condition, of the steel truss of FIG. 2A, according to one embodiment.
Figure 15B:
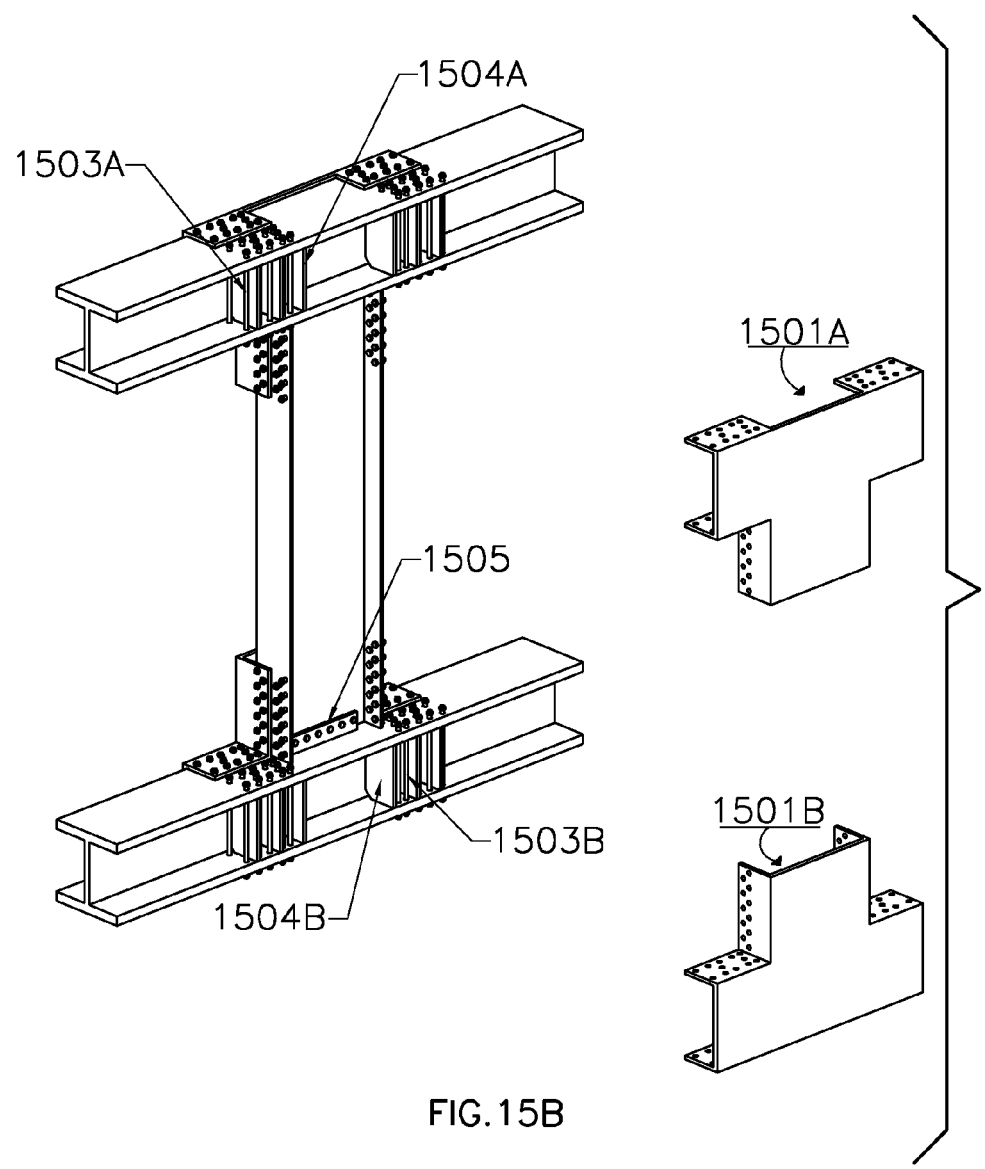
Figure 15C:
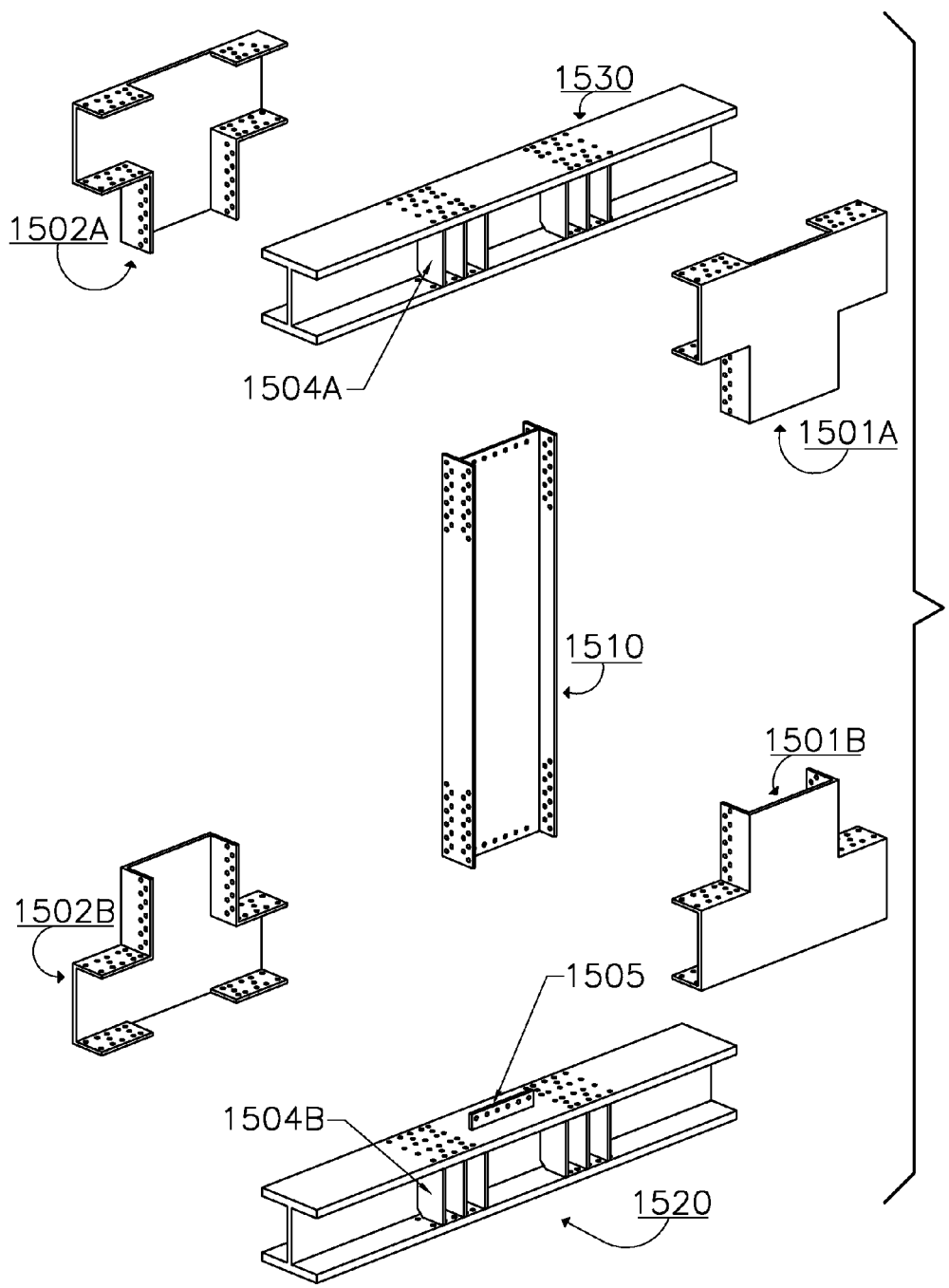
Figure 16A:
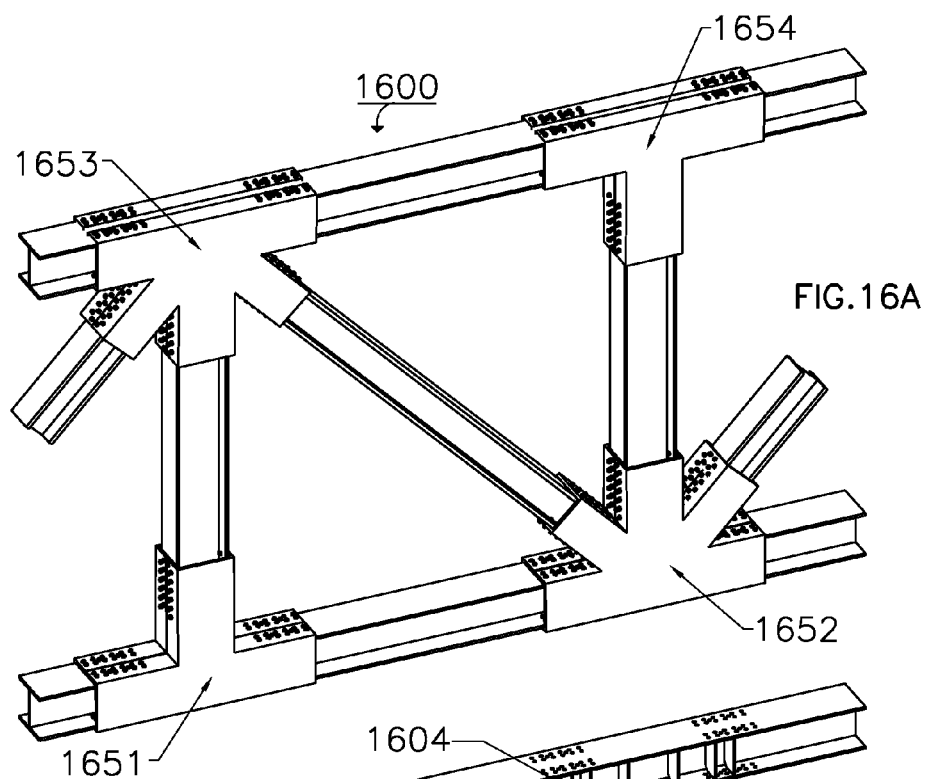
FIGS. 16A-B, are schematic diagrams illustrating a steel bridge truss segment, of the steel truss of FIG. 2B, according to one embodiment.
Figure 16B:
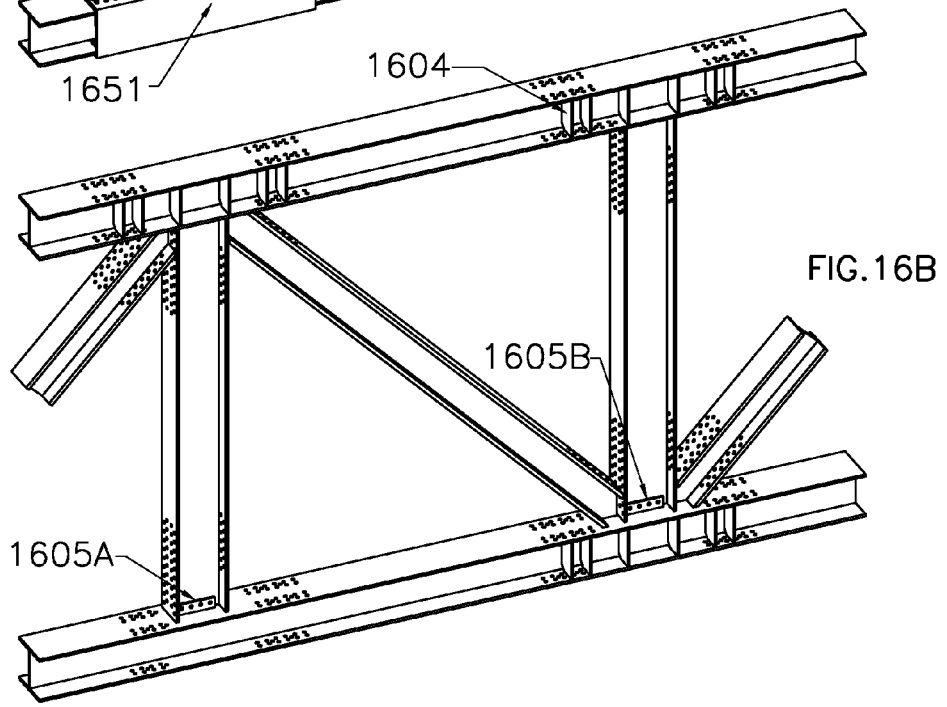

FIGS. 15A-C are schematic diagrams illustrating a Vierendeel truss, connection condition, of the steel truss of FIG. 2A, according to one embodiment. In this embodiment, the jacket plates 1501A and 1502A have a (T)-shape, and are substantially mirror in configuration; the jacket plates 1501B and 1502B have a inverted (T)-shape, and are substantially mirror in configuration.

Finally, FIGS. 16A-B, are schematic diagrams illustrating a steel bridge truss segment, of the steel truss of FIG. 2B, according to one embodiment. In this embodiment, the jacket plates 1651 has a inverted (T)-shape; the jacket plates 1652 and 1653 has the shape of a combination of a rotated (K)-shape and rotated (T)-shape; and the jacket plates 1654 has a (T)-shape.

The invention claimed is:

1. A three-dimensional jacket-plate connector to connect at least two I-beam members, each member comprising a steel I-beam section, the jacket-plate connector comprising
   a first three-dimensional jacket plate; and
   a second three-dimension jacket plate that is a mirror image of the first three-dimensional jacket plate, the two jacket plates bolted to opposite sides of a joint connecting a continuous primary I-beam member and one or more connected secondary I-beam members,
   wherein a jacket plate comprises one or more branching secondary C-channels connected to a continuous primary C-channel that intersect to match angles of the joint formed between a longitudinal axis of the one or more connected secondary I-beam members and a longitudinal axis of the continuous primary I-beam member,
   at least one threaded tension rod installed through the depth of the cross section of the primary C-channel of the jacket plate to transfer bending moments and shear forces across the joint, and
   at least one steel plate stiffener welded between the flange portions of the primary I-beam member to counteract the compression forces caused by the at least one threaded tension rod.

2. The connector of claim 1, wherein the primary and secondary C-channels comprise webs that are welded at an intersection to form a side plate on a common plane.

3. The connector of claim 2, wherein the primary and secondary C-channels comprise flanges that are welded at an intersection to form clamping plates around the perimeter of the side plate, where flanges or clamping plates are perpendicular to the side plate.

4. The connector of claim 3, wherein at the intersection a section of one side of the flanges of the primary C-channel between flanges of the secondary C-channel is notched out to accommodate the secondary I-beam member installed at the joint.

5. The connector of claim 3, wherein each pair of the flanges of the first and secondary C-channels clamps the opposing flanges of the corresponding I-beam member in the depth direction of the cross-section.

6. The connector of claim 1, wherein the connector forms one of, or a combination of, the following shapes: a (T)-shape, a (V)-shape, a (y)-shape, a (L)-shape, a (K)-shape, a rotated back-to-back dual (K)-shape, a rotated (T)-shape, a tilted (V)-shape, a rotated (y)-shape, a rotated (K)-shape, an (X)-shape, a (cross) or (+)-shape, a rotated (cross) or (+)-shape, a full or partial (asterisk)-shape.

7. The connector of claim 1,
wherein the jacket plates comprise:
a plurality of pre-drilled holes in clamp plates configured for a bolted connection to the flange portion of each steel I-beam section.

8. The connector of claim 1, wherein bolts connect clamp plates of the jacket plates to flanges of the I-beam sections.

9. The connector of claim 1, wherein pre-drilled holes of clamp plates match pre-drilled holes of flanges of the I-beam members.

10. The connector of 1, wherein a box space surrounded by opposing flanges of the connected I-beam member in the vertical direction; and by a side plate of a jacket plate and the web of connected secondary I-beam member in the horizontal direction, allow access from an open end for tightening of nuts of bolts.

11. The connector of claim 1, wherein clamping plates of the jacket plates are welded to flanges of the first and secondary I-beam members.

12. The connector of claim 1, wherein the primary and secondary C-channels are formed using hot rolling.

13. The connector of claim 1, wherein the interior clear distance between a pair of opposing clamping plates of the jacket plate is substantially equal to an exterior depth of a cross-section of either the primary or secondary I-beam members.

14. The connector of claim 1, wherein the secondary I-beam member is joined to the primary I-beam member at a non-perpendicular angle.

15. The connector of claim 1, wherein the joint comprises at least two secondary I-beam members.

16. The connector of claim 1, wherein at least one of the one or more secondary members is joined to the primary member at a non-perpendicular angle.

\* \* \* \* \*